United States Patent [19]

Schomaker et al.

[11] Patent Number: 5,750,030
[45] Date of Patent: May 12, 1998

[54] USE OF SYNTHETIC GRANULATE OR POWDER FOR THE REMOVAL OF LIQUID, GASEOUS AND/OR DISSOLVED CONSTITUENTS FROM A PROCESS STREAM

[75] Inventors: Elwin Schomaker, Velp; Johannes Bos, Westervoort; Erik Leonard Middelhoek, Arnhem, all of Netherlands

[73] Assignee: Akzo Nobelnv, Arnhem, Netherlands

[21] Appl. No.: 699,003

[22] Filed: Aug. 16, 1996

[30] Foreign Application Priority Data

Aug. 17, 1995 [NL] Netherlands ............ 1000997

[51] Int. Cl.$^6$ .................... B01D 15/00; B01D 53/02
[52] U.S. Cl. ..................... 210/679; 95/90
[58] Field of Search .................... 210/679, 505, 210/508, 509, 692, 693; 95/90, 135, 136, 137

[56] References Cited

U.S. PATENT DOCUMENTS

| | | | |
|---|---|---|---|
| 4,239,516 | 12/1980 | Klein | 210/505 |
| 4,247,498 | 1/1981 | Castro | 264/41 |
| 4,659,473 | 4/1987 | Klein | 210/638 |

FOREIGN PATENT DOCUMENTS

| | | |
|---|---|---|
| 155501 | 9/1985 | European Pat. Off. . |
| 173382 | 3/1986 | European Pat. Off. . |
| 365111 | 4/1990 | European Pat. Off. . |
| 662338 | 7/1995 | European Pat. Off. . |
| 662344 | 7/1995 | European Pat. Off. . |
| 3011692 | 10/1981 | Germany . |
| WO 94/03249 | 2/1994 | WIPO . |

OTHER PUBLICATIONS

Patent Astracts of Japan, vol. 12, No. 56 (C–477) 1988.
Derwent Patent Abstract 87-288418 (1987).
Derwent Patent Abstract 73969 D/41 (1980).

*Primary Examiner*—Ivars Cintins
*Attorney, Agent, or Firm*—Richard P. Fennelly; Louis A. Morris

[57] ABSTRACT

It is proposed to use a synthetic granulate or powder with a particle size of 0.1 to 10 mm as packing material for the removal of liquid, gaseous and/or dissolved constituents from a process stream, which packing material is made up of a porous, preferably dimensionally stable polymer having an overall porosity of 50 to 95% by volume, which when used as an extracting medium has pores of a diameter of 0.01 to 50 μm, with an extracting liquid immobilised therein, or when used as a coalescence medium has a cellular body/window structure with the diameter of more than 50% by volume of the bodies being in the range of 100 to 700 μm, which materials can be obtained by dissolving a polymer in one or more liquid and miscible compounds at a temperature above the upper critical phase separation temperature Tc, followed by a lowering of the temperature and mechanical diminution of the polymer filled with the liquid compounds, optionally followed by removal of the liquid therefrom and, optionally, refilling of at least 10% of the pore volume with an extracting liquid, characterised in that the polymer solution incorporates 5 to 60% by volume of filler, calculated on the overall solids content. The granulate or powder preferably is subjected to an aftertreatment by being coated with a powder or fibrous material having a softening temperature or melting temperature higher than that of the material to be coated.

13 Claims, No Drawings

USE OF SYNTHETIC GRANULATE OR POWDER FOR THE REMOVAL OF LIQUID, GASEOUS AND/OR DISSOLVED CONSTITUENTS FROM A PROCESS STREAM

The invention pertains to the use of a synthetic granulate or powder with a particle size of 0.1 to 10 mm as packing material for the removal of liquid, gaseous and/or dissolved constituents from a process stream, which packing material is made up of a porous, preferably dimensionally stable polymer having an overall porosity of 50 to 95% by volume, which when used as an extracting medium has pores of a diameter of 0.01 to 50 µm, preferably of 0.1 to 50 µm, with an extracting liquid immobilised therein, or when used as a coalescence medium has a cellular body/window structure with the diameter of more than 50% by volume of the bodies being in the range of 100 to 700 µm, which materials can be obtained by dissolving a polymer in one or more liquid and miscible compounds at a temperature above the upper critical phase separation temperature Tc, followed by a lowering of the temperature and mechanical diminution of the polymer filled with the liquid compounds, optionally followed by removal of the liquid therefrom and, optionally, refilling of at least 10% of the pore volume with an extracting liquid.

The use of synthetic granulates or powders to extract liquid, gaseous and/or dissolved constituents is known from WO 94/03249, EP-A-662 338, and EP-A-662 344.

The first of these patent publications describes the extraction from water of hydrophobic constituents, such as benzene, toluene, xylene and/or chlorinated hydrocarbons, dissolved in said water. The second patent publication describes the removal of gaseous impurities, such as $H_2S$, COS, $CS_2$, and $SO_2$, from a gas mixture. To this end a secondary amine which bonds with the constituents to be removed is incorporated into the pores of the synthetic granulate or powder. The last of the aforementioned patent publications discloses as a possible use the extraction of metal ions from an aqueous solution. The extracting agents used include organic phosphorus compounds or a hydroxyoxim in a non-hydrolysable, high-boiling solvent, such as paraffin oil, dibenzyl toluene, and polypropylene glycol ether having a molecular weight of 600 to 1500. At about the time when the synthetic granulates or powders are in danger of becoming saturated with the constituents to be extracted, they are regenerated by passing through the column for some considerable time steam or a solution of an acid or base, depending on the nature of the extracted constituents.

The use of synthetic granulates or powders in liquid/gas separation and/or liquid/liquid separation through coalescence is part of non-prepublished European patent application 95201317.5.

The principal parameters determining the effectiveness of a column filled with particles in which a liquid extracting medium is immobilised are the equilibrium constant of the distribution of the substance to be extracted over the continuous phase to be extracted and the immobilised phase, the rate of mass transfer, and the degree to which the continuous medium to be extracted is subject to axial mixing in the column. At high mass transfer rates this last factor becomes ever more important. The degree to which there is axial mixing can be related to the number of mixers in series ($N_{mix}$), the column being considered a so-called "cascade of ideal mixers in series." $N_{mix}$ is determined by measuring the so-called residence time distribution, which is done as follows. Over a short period of time, starting at t=0, there is injected into the influent of the column a solution of a constituent which is soluble only in the influent and has no other affinity with the packing material. Next, in the effluent the concentration of the constituent is determined as a function of time. By plotting the measurement data against time in a graph, a curve is obtained the shape of which can be described by the following formula:

$$E(t) = N_{mix}^{N_{mix}} \left( \frac{t}{\tau} \right)^{N_{mix}-1} e^{(-N_{mix}\frac{t}{\tau})} \frac{1}{(N_{mix}-1)!}$$

wherein $E(t)=C_{eff(t)}/C_{infl(0)}$, wherein
$C_{eff(t)}$=the concentration of the constituent in the effluent at time t,
$C_{infl(0)}$=the concentration of the constituent in the influent at time t=0,
$N_{mix}$=number of ideal mixers, $\tau$=average residence time (s), and t=time in (s).

$\tau$ is calculated by: $\tau = \epsilon_b \, V_c / \Phi_v$, (2), wherein
$\epsilon_b$=bed porosity, $V_c$=column volume ($m^3$), and $\Phi_v$=rate of flow ($m^3/s$).

Introducing the measured values into the above formulae makes it possible to calculate the value for the number of mixers in series, $N_{mix}$.

The effectiveness of an unfilled column for liquid/gas separation and/or liquid/liquid separation can be calculated in an analogous manner. Here again, $N_{mix}$ can be determined by measuring the residence time distribution of an inert constituent.

It has since been found that especially in the case of industrial scale use employing larger-size columns there is a marked deterioration of the homogeneity of the packing already after one or two regenerations, resulting in the column no longer meeting the desired specifications in many situations and the switch to more and/or larger columns becoming compulsory.

The invention now provides for the use of a synthetic granulate or powder which obviates wholly or for the most part the problems which arise when the known granulate or powder is used.

The invention consists in that when employing a synthetic granulate or powder of the known type mentioned in the opening paragraph, use is made in its preparation of a polymer solution incorporating 5 to 60% by volume of filler, calculated on the overall solids content.

Favourable results are achieved using a packing material obtained from a polymer solution consisting of 50 to 90% by volume of solvent and 50 to 10% by volume of solids, of which preferably 60 to 95% by volume was composed of polymer and 5 to 40% by volume was composed of filler.

Optimum results can be achieved using a packing material of which 60 to 80% by volume is composed of solvent and 20 to 40% by volume is composed of solids, with 70 to 90% by volume being taken up by the polymer and 10 to 30% by volume being taken up by the filler.

The filler may be composed of particulate powder and/or natural or synthetic fibres. Examples of suitable fillers are ceramic material, glass, carbon, metal and/or synthetic material.

Very favourable results can be achieved when at least 10% by volume of the filler is made up of fibres, e.g., glass fibres and/or carbon fibres. Examples of other suitable materials of which the fibres can be made are polyesters such as polyethylene terephthalate, polyester amides, polyamides, vinyl polymers such as polyolefin ketones, rayon, cellulose, polyaramid and/or silica.

The selection of the filler type as well as the polymer type is highly dependent on the envisaged application. Also, the adhesion of the filler to the polymeric matrix material may be relevant when making the definitive selection. A major consideration in opting for a particular type of polymer is the degree to which the polymer has hydrophobic, or hydrophilic, properties. In general, the polymers qualifying for use are those which are known to be suitable for making porous polymeric materials such as described in U.S. Pat. No. 4,247,498.

Examples of hydrophobic polymers deemed more or less suitable for the use of the present invention are:

low-density polyethylene, high-density polyethylene, polypropylene, polystyrene, acrylonitrile-butadiene-styrene terpolymers, styrene-acrylonitrile copolymers, styrene-butadiene copolymers, poly(4-methyl-pentene-1), and polybutene. Particular preference is given in this case to polymers based on polyolefins, notably polypropylene. Examples of suitable hydrophilic polymers are:

polyvinyl acetate, a copolymer of vinyl acetate and vinyl alcohol, polyamide-2,2, polyamide-4,6, polyoxymethylene, polyolefin ketones, polyacrylonitrile, polyvinylidene chloride, and polysulphone.

When preparing the porous synthetic granulate or powder which according to the invention qualifies for use as an extracting agent, the procedure employed usually is such that first 5–90 wt. % of a polymer is dissolved, with heating, at a temperature above the upper critical phase separation temperature (Tc) in 10–95 wt. % of one or more liquid and miscible compounds A, B, C, etc., with the selected mixing ratios of these compounds to one another being such as will give phase separation on cooling, resulting in a polymer-rich and a polymer-poor phase. In so far as the filler has not been incorporated into the polymer yet, it is also added in such an amount during the preparation that the filler will account for 5 to 60% by volume of the overall solids content. On further lowering of the temperature said phase separation structure is then fixed prior to the completion of the phase separation due to the polymer vitrifying or crystallising, resulting in a porous polymer material the pores of which are filled with one or more of the compounds A, B, C, etc. After diminution to the desired particle size the granulate or powder is ready in principle for use in an extracting column. If so desired, the granulate may be extracted and then filled with a different type of oil, one, say, which is more resistant to the process conditions.

When preparing the porous synthetic granulate or powder which according to the invention qualifies for use in a packed filter bed for liquid/gas separation and/or liquid/liquid separation, the procedure employed usually is such that first 10–40 wt. % of a polymer is dissolved, with heating, at a temperature above the upper critical phase separation temperature Tc, in 60–90 wt. % of one or more liquid and miscible compounds A, B, C, etc., with the selected mixing ratios of these compounds to one another being such as will give phase separation on cooling at a temperature which is at least 20° C. above the polymer melting point in the case of a crystalline polymer or above the glass transition temperature (Tg) in the case of an amorphous polymer, resulting in a polymer-rich and a polymer-poor phase. In so far as the filler has not been incorporated into the polymer yet, it is also added in such an amount during the preparation that the filler will account for 5 to 60% by volume of the overall solids content. On further lowering of the temperature at a cooling rate of less than 3° C./min said phase separation structure is then fixed prior to the completion of the phase separation due to the polymer vitrifying or crystallising. As a general rule, an increase in the phase separation temperature is attended with increased dimensions of the bodies and the windows. This effect was found to be further reinforced by a lowering of the cooling rate and/or the polymer content.

The melting point was determined by DSC using a TA-instruments apparatus having a heating-up rate of 20° C./minute.

The phase separation temperature was determined by optical microscopy, in combination or not with a phase contrasting technique. To this end, the mixture was first homogenised at a temperature above the phase separation temperature and then cooled down at 10° C./minute, the phase separation temperature being established visually. When using polymer/solvent systems with slightly differing refractive indices, a light scattering technique may be employed.

According to the invention, favourable results were obtained with fibres having a diameter<50 µm at a fibre length in the granulate<5 mm and a length:diameter ratio (L/D)>5.

Very favourable results can be obtained using fibres having a diameter in the range of 5 to 20 µm, with a fibre length in the granulate in the range of 0.1 to 1.5 mm.

It was found that the favourable results achieved when using a filler in the synthetic granulate or powder can be improved still further when the granulate or powder is further subjected to an aftertreatment by being coated with a powder or a fibrous material having a higher softening temperature or melting temperature than that of the material to be coated. Preference is given in this case to the use of a powder or a fibrous material which is wetted more thoroughly by the liquid in the material to be coated than by the liquid or gas forming part of the process stream.

So far, favourable results have been achieved using a powder composed of ceramic material, glass, metal or synthetic material, preferably a powder based on carbon.

In the case of a fibrous material being employed, preference is given to fibres made of silicon carbide, silicon nitride, carbon, graphite and/or aluminium oxide, with fibre diameter dimensions of from 0.5 to 10 µm.

The invention will be further elucidated with reference to the following examples, which of course are for illustrative purposes only and not to be construed as limitations upon the scope of the present invention.

EXAMPLE I (COMPARATIVE EXAMPLE)

25 parts by weight (pbw) of polypropylene (type Kl öckner C10 BB, melting point 166° C.) were mixed with 56 pbw of soybean oil (ex Vandermoortele) and 19 pbw of castor oil (ex Castrol) in a pin-type mixer at 250° C. The solution was discharged into a stainless steel receptacle and then cooled in air at a cooling rate differing by 3° to 0.5° C. per minute (on average by 1.5° C. per minute) in the range of 255° C. to 75° C.

The resulting porous polymer had a porosity of 75% and a cellular body-window structure with an average cell diameter of 15±5 µm (determined by scanning electron microscopy). The material was then ground up into particles having an average diameter ($d_{0.5;v,v}$) of 0.4 mm (determined using a Malvern particle sizer 2600C).

The thus obtained granules were extracted and then filled with an 80/20 mixture of trialkyl mellitate having on average 8 carbon atoms in the alkyl group (Emkarate 7930, ex ICI), and castor oil (ex Castrol).

5

EXAMPLE II (COMPARATIVE EXAMPLE)

In a manner analogous to that disclosed in Example I, 25 pbw of polypropylene (type Klöckner C10 BB, melting point 166° C.) were turned via extrusion followed by chopping into a porous granulate having a diameter and a length of 1 mm and an average pore size ranging from 0.2 to 0.5 µm, which granulate after being extracted was filled with a 60/15 mixture of 60 pbw of trialkyl mellitate having on average 8 carbon atoms in the alkyl group (Emkarate 7930, ex ICI), and 15 pbw of castor oil (ex Castrol).

The granules were then mixed with a small quantity of activated carbon (type SA Super, ex Norit; BET 900 m$^2$/g; 3%>150 µm, 40%<10 µm). The granules treated in this fashion contained 0.06 wt. % of activated carbon.

EXAMPLE III

In a manner analogous to that disclosed in Example I, 38 pbw of polypropylene (type G3 NO1, ex Hoechst) filled with 30 w. % of glass fibre (average diameter 12 µm) were mixed with 50 pbw of trialkyl mellitate having on average 8 carbon atoms in the alkyl group, and 12.5 pbw of castor oil. A thread was produced by extrusion, which was subsequently chopped up into a granulate consisting of 1 mm long and 1 mm thick granules having an average pore size ranging from 0.2 to 0.5 µm.

The granules were then mixed with a small quantity of activated carbon (type SA Super, ex Norit; BET 900 m$^2$/g; 3%>150 µm, 40%<10 µm). The thus treated granules contained 0.06 wt. % of activated carbon.

EXAMPLE IV (COMPARATIVE EXAMPLE)

A 40 cm long cylindrical glass column with a diameter of 5 cm was filled with 0.4 kg of Example I material prior to extraction and being filled with an 80/20 mixture of trialkyl mellitate having on average 8 carbon atoms in the alkyl group, and castor oil. As the column was flushed with water at a rate of flow of 1 l water/hour, for 1 second a pulse of 100 µl saturated NaCl solution was provided, after which the salt concentration in the effluent was measured as a function of time by conductivity measurements.

The number of ideal mixers in series, $N_{mix}$, was determined by introducing a number of values from the curve obtained by experiment into the following formula:

$$E(t) = N_{mix}^{N_{mix}} \left(\frac{t}{\tau}\right)^{N_{mix}-1} e^{(-N_{mix}\frac{t}{\tau})} \frac{1}{(N_{mix}-1)!}$$

wherein $E(t) = C_{eff(t)}/C_{infl(t0)}$, wherein $C_{eff(t)}$=the concentration of the constituent in the effluent at time t, $C_{infl(t0)}$=the concentration of the constituent in the influent at time t=0, $N_{mix}$=number of ideal mixers, τ=average residence time (s), and t=time in (s).

τ is calculated by: τ=$\epsilon_b$ $V_c/\Phi_v$, (2), wherein $\epsilon_b$=bed porosity, $V_c$=column volume (m$^3$), and $\Phi_v$=rate of flow (m$^3$/s).

Introducing the measured values into the above formulae makes it possible to calculate the value for the number of mixers in series, $N_{mix}$.

For the freshly packed column the number of mixers in series was calculated to be 538 per m.

6

Next, over a period of 1.5 hours, steam of 105°–110° C. was passed through the column at a flow rate of 0.7 kg/hour, whereupon the number of mixers was determined once more in accordance with the aforementioned procedure. It was found that after regeneration with steam the number of mixers had been reduced to 78 per m.

EXAMPLE V (COMPARATIVE EXAMPLE)

The experiment of Example IV was repeated, except that this time use was made of 0.435 kg of granulate filled after extraction with an 80/20 mixture of trialkyl mellitate having on average 8 carbon atoms in the alkyl group, and castor oil. The number of mixers was determined to be 413 per m for the freshly packed column, 50 per m after 1x steam regeneration, and 47 per m after 2x steam regeneration.

EXAMPLE VI (COMPARATIVE EXAMPLE)

The experiment of Example IV was repeated, except that this time use was made of 0.477 kg of Example II granulate after treatment with activated carbon. The number of mixers was determined to be 385 per m for the freshly packed column, and 230 per m after 1x steam regeneration.

EXAMPLE VII

The experiment of Example IV was repeated, except that this time use was made of 0.439 kg of Example III granulate after treatment with activated carbon. The number of mixers was determined to be 325 per m for the freshly packed column, and 343 per m, 350 per m, 353 per m, and 368 per m, respectively, after 1x, 2x, 3x, and 4x steam regeneration.

EXAMPLE VIII

The experiment of Example IV was repeated, except that this time use was made of a 1.88 m long column with a 22 cm diameter which was filled with 38.05 kg of Example III material after treatment with activated carbon. After flushing with 300 l water per hour a saline pulse of 20 ml was provided. Regeneration took place using steam with a flow rate of 4.4 kg/hour.

The number of mixers was determined to be 63 per m for the freshly packed column, and 64 per m, 53 per m, 53 per m, 45 per m, and 44 per m, respectively, after 1x, 2x, 3x, 4x, and 5x steam regeneration.

EXAMPLE IX

The experiment of Example IV was repeated, except that this time use was made of a 0.8 m long column with a 1.60 m diameter which was filled with 824 kg of Example III material after treatment with activated carbon. After flushing with 16 m$^3$ water per hour a 10-second saline pulse was provided at a flow rate of 0.4 m$^3$ per hour. For regeneration, steam having a flow rate of 300 kg per hour was used for 30 minutes, followed by another 30 minutes of steam at a flow rate of 150 kg per hour.

The number of mixers was determined to be 43 per m for the freshly packed column, and 29 per m, 29 per m, 29 per m, and 31 per m, respectively, after 1x, 2x, 3x, and about 30x steam regeneration. Given the fact that the number of mixers remained constant even after about 30x regeneration, it can be concluded that the now proposed materials can be used on a commercial scale without any appreciable problems.

EXAMPLE X

The experiment of Example VIII was repeated, with use being made of a granulate of a composition comparable with that in Example III, except that this time the length of the granules in the granulate was 1.2 mm at a diameter of 1.05 mm. The column had a filling weight of 40 kg.

The number of mixers was determined to be 73 per m for the freshly packed column, 50 per m after 50x steam regeneration, and 40 per m after 220x steam regeneration.

EXAMPLE XI

The experiment of Example IX was repeated, with use being made of a granulate of a composition comparable with that in Example III, except that this time the length of the granules in the granulate was 1.2 mm at a diameter of 1 mm. The column had a filling weight of 1550 kg. The column height was 1.6 mm, the rate of flow 16 m³/hour.

The number of mixers was determined to be 40 per m for the freshly packed column. After 30x regeneration it was found that the number of mixers per m remained unchanged. This shows that the now proposed granulate or powder can be used on an industrial scale without any significant deterioration in performance.

We claim:

1. A process for the removal of liquid, gaseous and/or dissolved constituents from a process stream by contacting that process stream with a synthetic granulate or powder with a particle size of 0.1 to 10 mm as the packing material for the removal of the liquid, gaseous and/or dissolved constituents from the process stream, which packing material is made up of a porous, polymer having an overall porosity of 50% to 95% by volume, which is used as an extracting medium and has pores of a diameter of 0.01 to 50 µm, with an extracting liquid immobilised therein, or which is used as a coalescence medium and has a cellular body/window structure with the diameter of more than 50% by volume of the bodies being in the range of 100 to 700 µm, which packing material is obtained by dissolving a polymer in one or more liquid and miscible compounds at a temperature above the upper critical phase separation temperature Tc, followed by a lowering of the temperature and mechanical diminution of the polymer filled with the liquid compounds, optionally followed by removal of the liquid therefrom and, optionally, refilling of at least 10% of the pore volume with an extracting liquid, wherein the polymer solution incorporates 5% to 60% by volume of filler, calculated on the overall solids content.

2. A process according to claim 1, wherein the packing material is obtained from a polymer solution consisting of 50% to 90% by volume of solvent and 50% to 10% by volume of solids.

3. A process according to claim 1, wherein the filler is made up of particulate powder and/or natural or synthetic fibres.

4. A process according to claim 1, wherein the filler is made up of ceramic material, glass, carbon, metal and/or synthetic material.

5. A process according to claim 1, wherein at least a portion of the filler is made up of fibres.

6. A process according to claim 5, wherein the fibres are glass fibres and/or carbon fibres.

7. A process according to claim 5, wherein the diameter of the fibres is <50 µm at a fibre length in the powder or granulate <5 mm and a length:diameter ratio (L/D)≧5.

8. A process according to claim 5, wherein the length of the fibres in the powder or granulate is in the range of 0.1 to 1.5 mm at a fibre diameter in the range of 5 to 20 µm.

9. A process according to claim 1, wherein the granulate or powder is further subjected to an after treatment by being coated with a powder or fibrous material having a higher softening temperature or melting temperature than that of the material to be coated.

10. A process according to claim 9, wherein the powder or fibrous material used for coating is more thoroughly wetted by the liquid in the material to be coated than by the liquid or gas forming part of the process stream.

11. A process according to claim 9, wherein the powder or fibrous material with which the granulate or powder is coated is made of carbon, ceramic material, glass, metal or synthetic material.

12. A process according to claim 9, wherein the fibrous material used for coating is made of fibres of silicon carbide, silicon nitride, carbon, graphite and/or aluminium oxide with fibre diameter dimensions of from 0.5 to 10 µm and a length:diameter ratio (L/D)≦10.

13. A process according to claim 1, wherein the packing material is a dimensionally stable polymer.

* * * * *